(12) United States Patent
Ohmoto

(10) Patent No.: US 10,871,553 B2
(45) Date of Patent: Dec. 22, 2020

(54) POSITION DETECTING DEVICE

(71) Applicant: HONDA MOTOR CO., LTD., Tokyo (JP)

(72) Inventor: Takahiro Ohmoto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 297 days.

(21) Appl. No.: 16/005,729

(22) Filed: Jun. 12, 2018

(65) Prior Publication Data

US 2018/0364329 A1 Dec. 20, 2018

(30) Foreign Application Priority Data

Jun. 19, 2017 (JP) ................ 2017-119692

(51) Int. Cl.
| | | |
|---|---|---|
| G01S 7/02 | (2006.01) | |
| G01S 7/40 | (2006.01) | |
| G01S 7/497 | (2006.01) | |
| G01S 13/931 | (2020.01) | |
| G01S 13/86 | (2006.01) | |

(52) U.S. Cl.
CPC ........... G01S 7/4004 (2013.01); G01S 7/02 (2013.01); G01S 7/4026 (2013.01); G01S 7/4972 (2013.01); G01S 13/931 (2013.01); G01S 13/867 (2013.01); G01S 2007/027 (2013.01); G01S 2013/9327 (2020.01); G01S 2013/93271 (2020.01)

(58) Field of Classification Search
CPC ........ G01S 7/02; G01S 7/4026; G01S 7/4004; G01S 7/4972; G01S 13/931; G01S 13/345; G01S 13/34; G01S 2013/9375; H01Q 1/3233

USPC .......................................................... 342/70
See application file for complete search history.

(56) References Cited

U.S. PATENT DOCUMENTS

2017/0225638 A1* 8/2017 Pan ...................... B60R 19/483
2017/0283086 A1* 10/2017 Garing ............... B64D 45/0005

FOREIGN PATENT DOCUMENTS

| EP | 1873552 | 1/2008 |
|---|---|---|
| JP | 2011-047722 | 3/2011 |
| JP | 2015-528117 | 9/2015 |
| WO | 2014014940 | 1/2014 |

OTHER PUBLICATIONS

Japanese Office Action for Japanese Patent Application No. 2017-119692 dated Dec. 21, 2018.

* cited by examiner

*Primary Examiner* — Harry K Liu
(74) *Attorney, Agent, or Firm* — Amin, Turocy & Watson, LLP

(57) ABSTRACT

A position detecting device used for positional adjustment of a radar sensor serving as an object detector mounted in a vehicle includes a connecting structure connected to the radar sensor, and a position reference holder that is supported by the connecting structure in a state in which a biasing force toward an initial position is applied, that is displaced against the biasing force in a state in which the connecting structure is connected to the radar sensor and that is pushed against a position reference of the radar sensor in a floating support state.

7 Claims, 13 Drawing Sheets

POSITION DETECTING DEVICE

CROSS-REFERENCE TO RELATED APPLICATION

Priority is claimed on Japanese Patent Application No. 2017-119692, filed Jun. 19, 2017, the content of which is incorporated herein by reference.

BACKGROUND OF THE INVENTION

Field of the Invention

The present invention relates to a position detecting device.

Description of Related Art

A vehicle including a radar sensor configured to detect an object such as another vehicle or the like disposed around an own vehicle is known. A radar sensor needs to be accurately aligned so that a system including the sensor is reliably operated. Published Japanese Translation No. 2015-528117 of the PCT International Publication discloses that a sensor positioning apparatus 100 includes a receiver flag 102 and an attachment arm section 104, and the attachment arm section 104 is attached to a radar sensor using a suction pad, an adhesive agent, friction, or the like.

SUMMARY

However, Published Japanese Translation No. 2015-528117 of the PCT International Publication simply discloses that a position detecting device such as the sensor positioning apparatus 100 or the like is attached to an object detector such as a sensor, and does not disclose absorbing an error when the position detecting device is attached to the object detector.

An aspect of the present invention is to provide a position detecting device capable of accurately detecting a position of an object detector by absorbing an error when attached to the object detector.

(1) A position detecting device according to an aspect of the present invention is a position detecting device used for positional adjustment of an object detector mounted on a vehicle, the position detecting device including: a connecting structure that is connected to the object detector; and a position reference member that is supported by the connecting structure in a state in which a biasing force toward an initial position is applied, that is displaced against the biasing force in a state in which the connecting structure is connected to the object detector and that is pushed against a position reference of the object detector in a floating support state.

(2) In the aspect of (1), the connecting structure may include a holding member that holds the object detector upon connection to the object detector, the holding member may include a guiding section that comes in contact with the object detector and that defines a relative position of the holding member with respect to the object detector, and the position reference member may be supported by the holding member.

(3) In the aspect of (2), the holding member may include a first abutting section that abuts a connecting section of the object detector from a first side in a first direction, the holding member may be supported by a main body section of the connecting structure in a state in which a first biasing force is applied toward a second side in the first direction, and the holding member may push the first abutting section against the connecting section of the object detector and hold the connecting section of the object detector while being displaced to the first side in the first direction against the first biasing force.

(4) In the aspect of (3), the connecting structure may further include a second holding member that holds the object detector together with the holding member, the second holding member may include a second abutting section that abuts the connecting section of the object detector from the second side in the first direction, and the first abutting section and the second abutting section may hold the connecting section of the object detector sandwiched therebetween in a state in which the holding member is displaced to the first side in the first direction against the first biasing force.

(5) In the aspect of (4), the second holding member may be a lever member that extends in the first direction and that is swingable about a swing shaft crossing the first direction, the lever member may include a lever protrusion that protrudes toward the second side in the first direction so as to overlap the object detector when seen in the first direction, the lever member may be supported by the main body section in a state in which a second biasing force is applied to cause the lever protrusion to approach the object detector, and the lever protrusion may include the second abutting section at the first side in the first direction, and a guide section, which is inclined so that more second side thereof in the first direction is more separated from the object detector, at the other side in the first direction.

(6) In the aspect of (5), the connecting structure may include: a pressing member that is movable toward the second side in the first direction with respect to the main body section and that is capable of performing a pushing operation toward the second side in the first direction upon connection to the object detector; a restricting member that is integrally movably supported by the pressing member, that is engageable with the lever member in the first direction and that restricts movement of the pressing member when engaged with the lever member in the first direction; and a recognition section that allows a worker to recognize that the pressing member has moved toward the second side in the first direction, wherein the restricting member may allow movement of the pressing member toward the second side in the first direction without engaging with the lever member in the first direction in a state in which the lever member is swung such that the lever protrusion overlaps the object detector when seen in the first direction, and the restricting member may engage with the lever member in the first direction and restrict movement of the pressing member toward the second side in the first direction in a state in which the lever member is swung such that the lever protrusion does not overlap the object detector when seen in the first direction.

(7) In the aspect of (5) or (6), the lever member may include an operation unit that swingably operates the lever member against the second biasing force.

According to the aspect of (1), when the connecting structure is connected to the object detector, since the position reference member is pushed against the position reference of the object detector in the floating support state, the position reference member can be reliably pushed against the position reference of the object detector without being affected by an error (deviation, tolerance, or the like, of the connecting portion) when the connecting structure is connected to the object detector. For this reason, positional or angular deviation of the object detector can be accurately detected by the position reference member, and positional adjustment of the object detector can be accurately performed.

According to the aspect of (2), since the position reference member is supported with respect to the holding member by which a relative position with respect to the object detector is defined, when the connecting structure is connected to the object detector, the holding member (the connecting structure) can be guided to the prescribed position by the guiding section without an accompanying load to the position reference member in a biased state. For this reason, positional deviation of the position reference member when the connecting structure is connected to the object detector is minimized, and a connecting operation of the connecting structure can be facilitated.

According to the aspect of (3), in a state in which the holding member is moved to the first side in the first direction against the first biasing force, since the holding member holds the object detector, the positional deviation, error, or the like, of the object detector can be absorbed in order to hold the object detector, and the connecting structure can be reliably connected to the object detector.

According to the aspect of (4), in a state in which the holding member is moved to the first side in the first direction against the first biasing force, since the object detector is sandwiched and held between the first abutting section of the holding member and the second abutting section of the second holding member, the positional deviation, error, or the like, of the object detector can be absorbed in order to hold the object detector, and the connecting structure can be reliably connected to the object detector.

According to the aspect of (5), when the position detecting device approaches the object detector from the first side in the first direction, the guide section of the lever protrusion comes in contact with the object detector, and the lever member is swung against the second biasing force by an inclination of the guide section. Accordingly, the lever protrusion can avoid the object detector, and the lever protrusion and the position detecting device can be moved to the second side in the first direction. In addition, when the lever protrusion passes beyond a range in which the lever protrusion is in contact with the object detector, the lever member is returned to the state before swinging by the second biasing force, and the lever protrusion is disposed at a position overlapping the object detector. Accordingly, the object detector can be sandwiched between the second abutting section of the lever member and the first abutting section of the holding member. In this way, since the position detecting device can be attached to the object detector by only a simple operation of causing the position detecting device to approach the object detector from the first side in the first direction, an attachment operation of the position detecting device can be easily and rapidly performed without applying a set tact.

According to the aspect of (6), in the case in which the position detecting device is attached to the object detector from the first side in the first direction, when the lever protrusion rides over the object detector and is disposed at a position which does not overlap the object detector (when in a state in the middle of attachment procedure of the position detecting device), since movement of the pressing member is restricted by the restricting member even the pressing member is pushed toward the second side in the first direction, a worker cannot recognize the movement of the pressing member even when the worker sees the recognition section. Meanwhile, since restriction of movement of the pressing member due to the restricting member is released when the lever protrusion passes beyond the range in which the lever protrusion comes in contact with the object detector and is disposed at a position which overlaps the object detector (when in a state in which the position detecting device is completely attached), the pressing member can be pushed to the second side in the first direction by continuing the attachment operation of the position detecting device, a worker can recognize movement of the pressing member when the worker sees the recognition section. In this way, the position detecting device can be attached to the object detector simply by only pushing the position detecting device into the object detector from the first side in the first direction, and inappropriate setting of the position detecting device can be minimized by the recognition section and reliable attachment can be performed while an attachment operation of the position detecting device can be easily and rapidly performed without applying a set tact.

According to the aspect of (7), when the operation unit of the lever member is operated in a state in which the position detecting device is attached to the object detector, the lever member is swung against the second biasing force, and the lever protrusion is moved to a position that does not overlap the object detector. Accordingly, sandwiching of the object detector between the second abutting section of the lever member and the first abutting section of the holding member can be released. Here, the position detecting device is moved to the first side in the first direction with respect to the object detector by the biasing force accumulated in the biasing members of the position reference member and the holding member. That is, the position detecting device can be removed from the object detector simply by only operating the operation unit of the lever member, and a removal operation of the position detecting device can be easily and rapidly performed without applying a tack even upon removal of the position detecting device.

DESCRIPTION OF EMBODIMENTS

Figure 1:
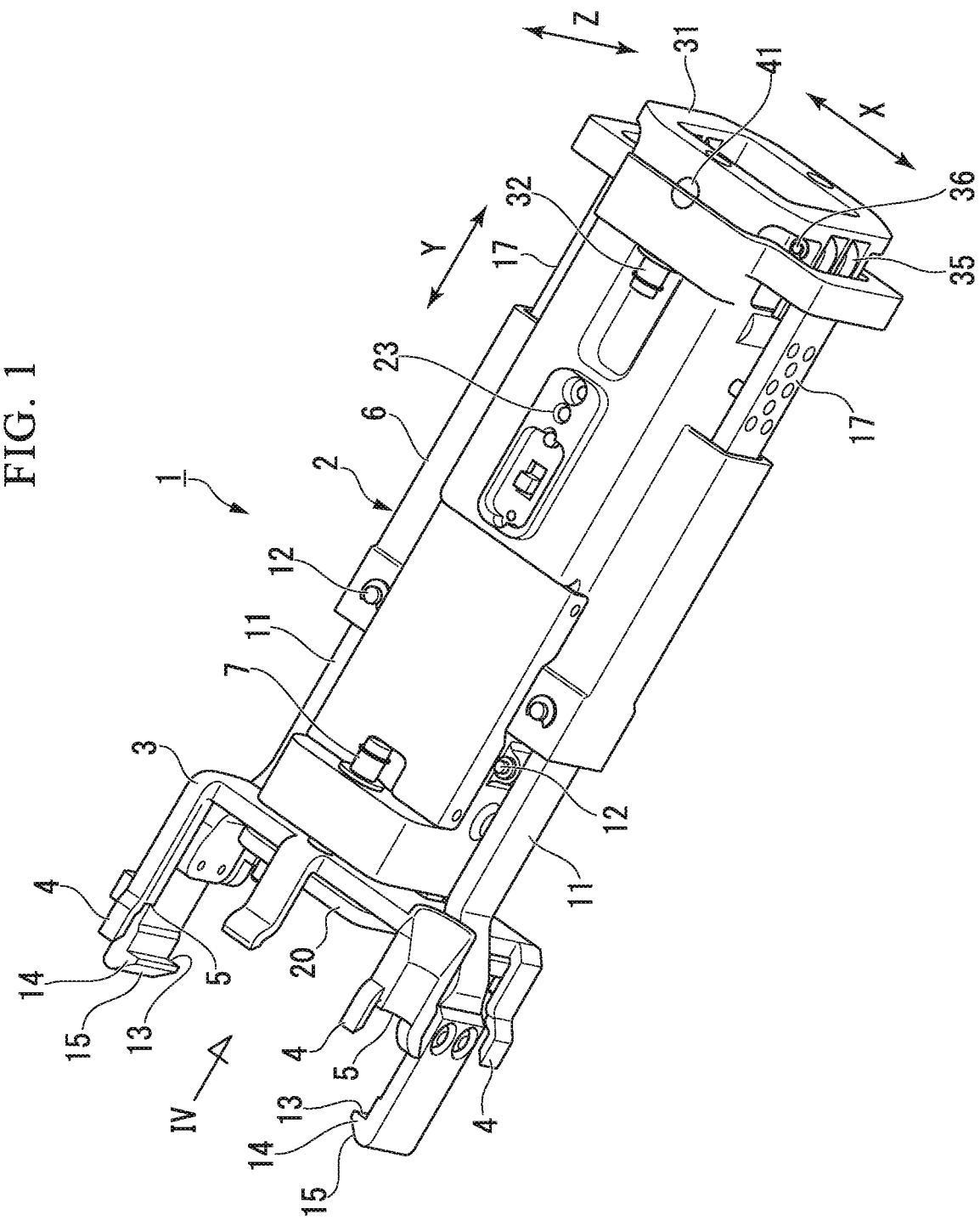
FIG. 1 is a perspective view of a position detecting device of a first embodiment.

Hereinafter, embodiments of the present invention will be described with reference to the accompanying drawings. Further, in the following description, a first direction shown by an arrow Y in the drawings indicates a depth direction of a position detecting device of the embodiment, a second direction shown by an arrow X indicates a widthwise direction perpendicular to the depth direction of the position detecting device, and a third direction shown by an arrow Z indicates a height direction perpendicular to the depth direction and the widthwise direction of the position detecting device. In addition, an axis along the arrow Y is referred to as a Y axis, an axis along the arrow X is referred to as an X axis, and an axis along the arrow Z is referred to as a Z axis.

First Embodiment

Figure 2:
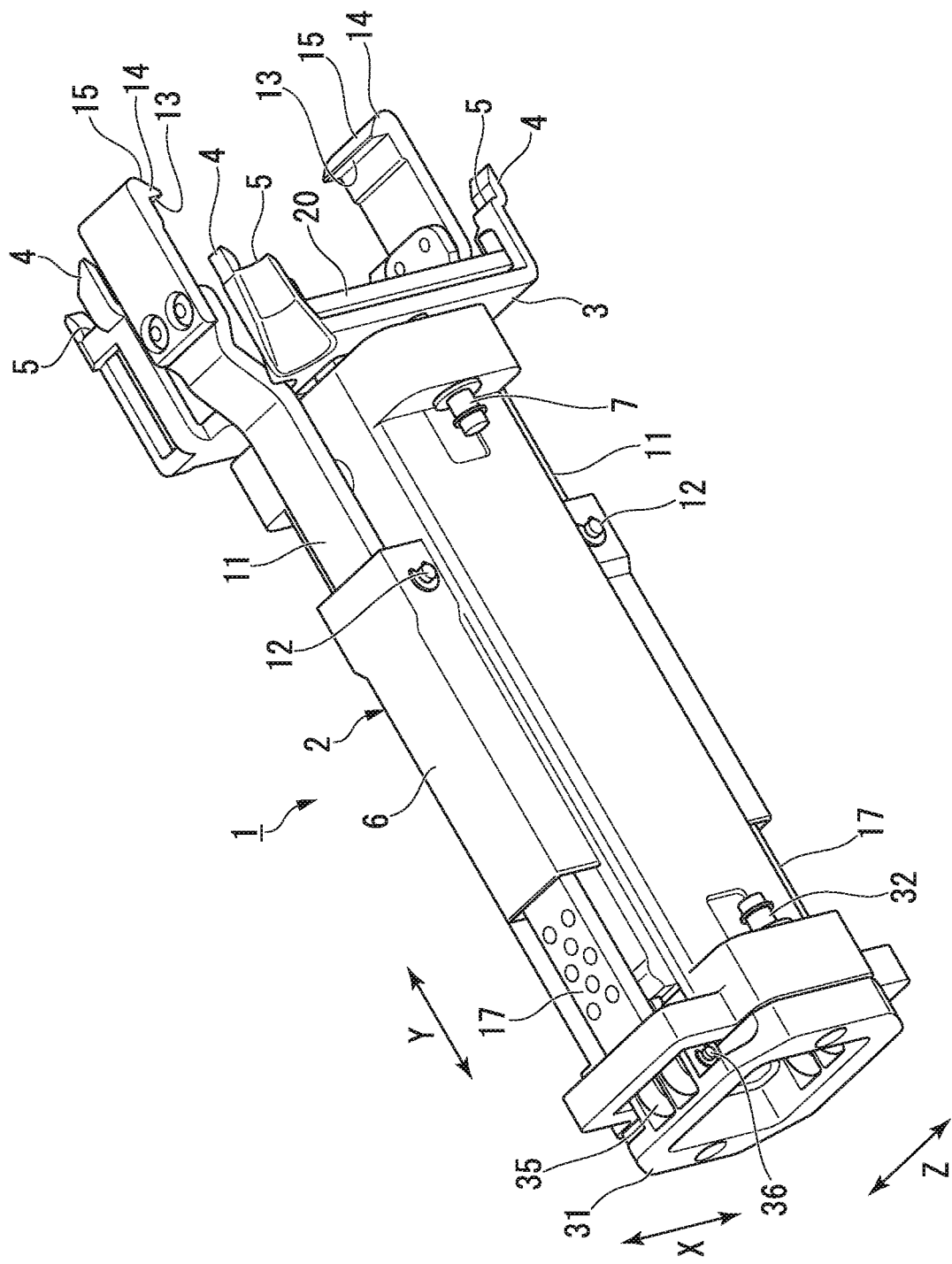
FIG. 2 is a perspective view of the position detecting device of the first embodiment.
Figure 3:
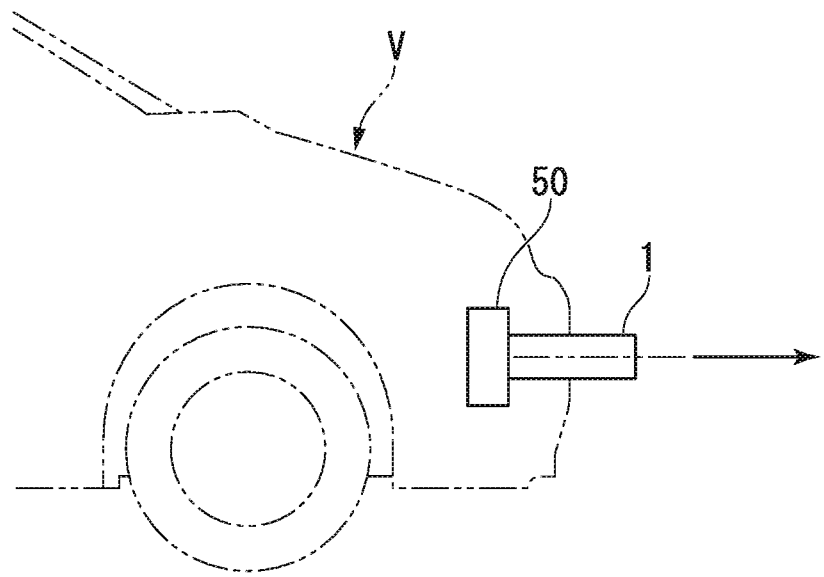
FIG. 3 is a side view showing a use example of the position detecting device of the first embodiment.

As shown in FIG. 1 to FIG. 3, a position detecting device 1 is attached to a radar sensor (an object detector) 50 fixed via a bracket or the like at a prescribed position of a vehicle V with a disposition in which a depth direction is oriented in a laser-emitting direction, and used for positional adjustment of the radar sensor 50. The position detecting device 1 is attached with respect to the radar sensor 50 while approaching in the depth direction from one side (hereinafter, referred to as a rear side or a first side) to the other side (hereinafter, referred to as a front side or a second side) in the depth direction. The position detecting device 1 includes a connecting structure 2 fixedly (integrally) connected to the radar sensor 50, and a position reference holder 20 (a position reference member) that is supported by the connecting structure 2 in a state in which a biasing force is applied toward an initial position, that is displaced against the biasing force when the connecting structure 2 is connected to the radar sensor 50 and that is pushed against position reference 52 (see FIG. 5, 7-9) of the radar sensor 50 in a floating support state.

The connecting structure 2 includes a holding member 3 at a rear side in the depth direction. The holding member 3 holds the radar sensor 50 together with a lever member (a second holding member) 11, which will be described below, upon connection to the radar sensor 50 (see FIG. 9).

Figure 4:
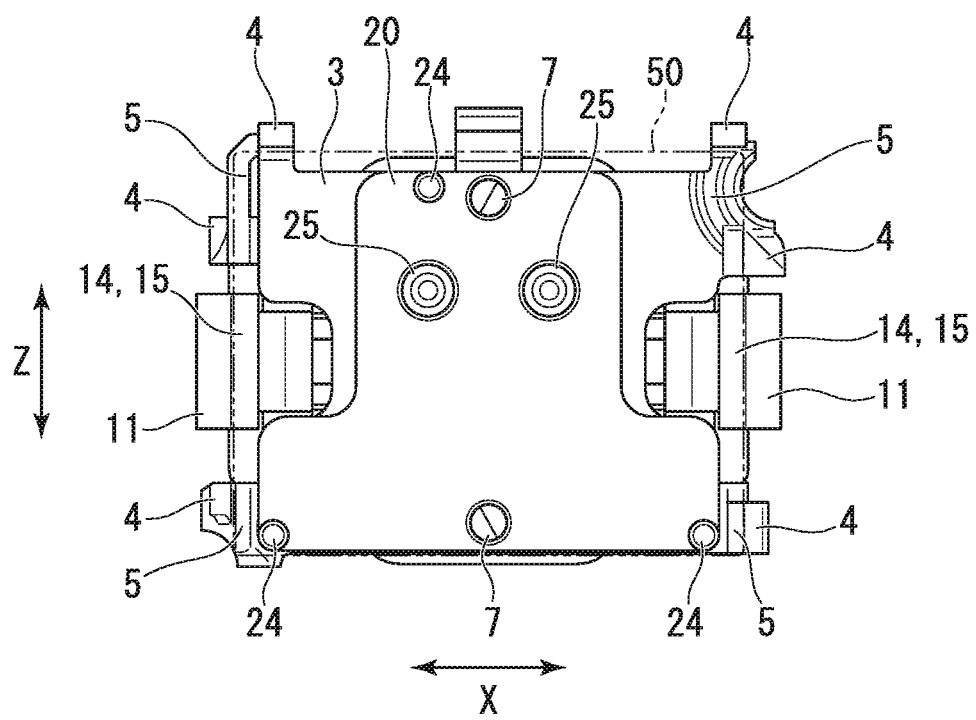
FIG. 4 is a front view of a holding member of the position detecting device of the first embodiment.
Figure 5:
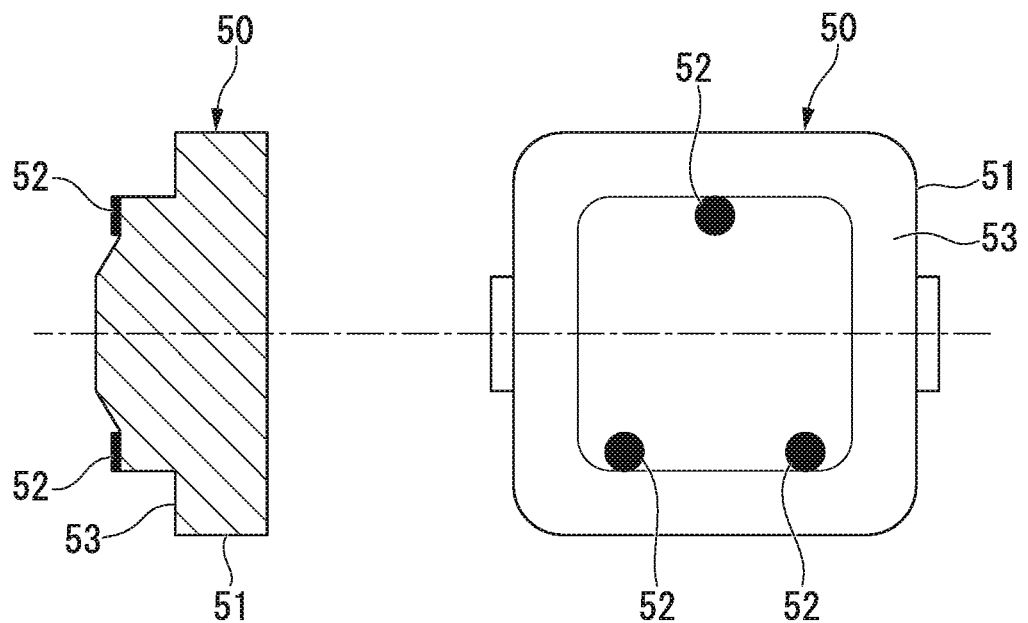
FIG. 5 is a view for schematically explaining a radar sensor of the first embodiment.

Referring to FIG. 4 along with FIG. 5, the holding member 3 includes a plurality of guiding claws (guiding sections) 4 to align with an outer portion 51 avoiding an antenna (a detection unit) with respect to the radar sensor 50 having a substantially rectangular shape when seen in a front view in the depth direction. The plurality of guiding claws 4 come in sliding contact with the outer portion 51 of the radar sensor 50 and define a relative position of the holding member 3 with respect to the radar sensor 50 in a widthwise direction and a height direction when the connecting structure 2 is connected to the radar sensor 50.

The position reference holder 20 is supported by the holding member 3.

Figure 6:
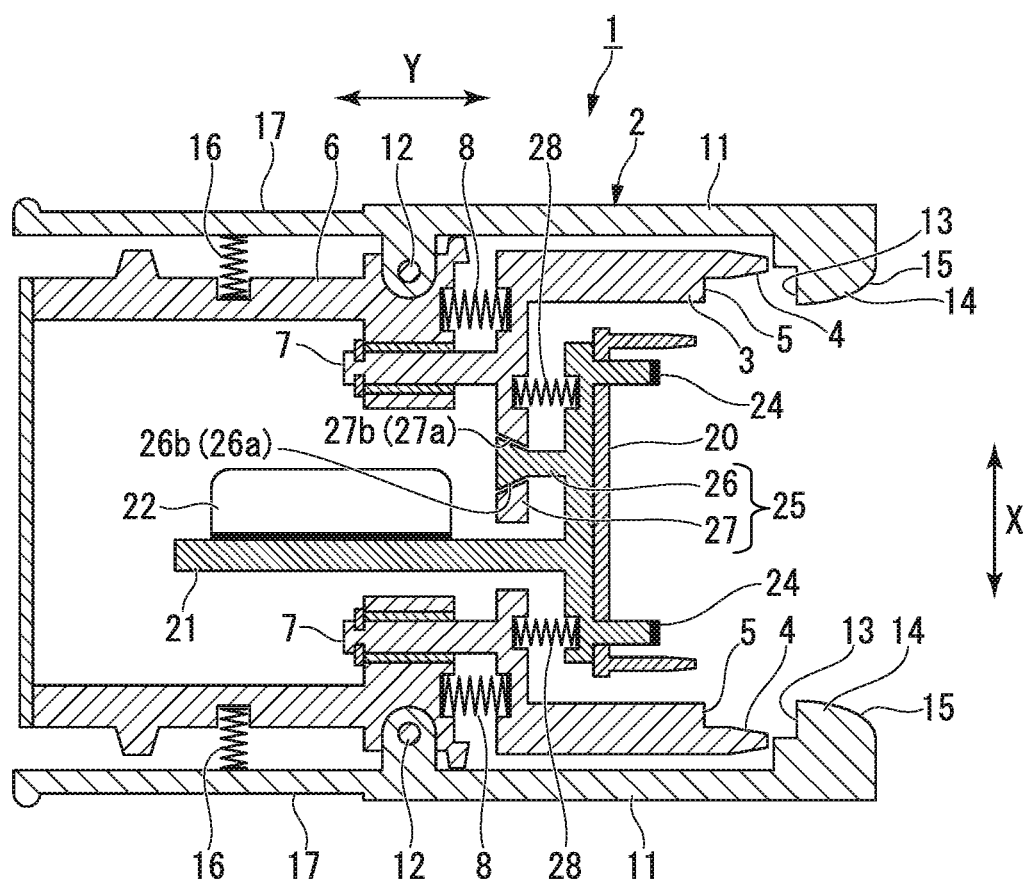
FIG. 6 is a schematic cross-sectional view of the position detecting device of the first embodiment.

As shown in FIG. 6, the position reference holder 20 includes a sensor support arm 21 passing through the holding member 3 and extending rearward. The sensor support arm 21 reaches an inside of a main body section 6 of the connecting structure 2, and a sensor main body 22 such as a leveling instrument or the like is supported by the sensor support arm 21. Levelness, an angle, or the like, of the radar sensor 50 which is an object to be inspected is detected by the sensor main body 22. Further, FIG. 6 is a schematic cross-sectional view and has a part different from those in FIG. 1, FIG. 2 and FIG. 4.

As shown in FIG. 1, the position detecting device 1 of the embodiment includes a display unit 23 configured to display a detection result to a worker. The display unit 23 is constituted by, for example, a lamp configured to show whether a position detecting result of the radar sensor 50 is passing or failing. Further, the display unit 23 may be constituted by a liquid display panel or the like, and may show a detected numerical value or the like.

Referring back to FIG. 6, the position reference holder 20 is supported on the holding member 3 through a tapered structure section 25 and biasing members 28.

The tapered structure section 25 includes a tapered shaft section 26 extending rearward from the position reference holder 20 in the depth direction, and a tapered hole forming section 27 formed in the holding member 3 and engaged with the tapered shaft section 26.

The tapered shaft section 26 has an engaging section 26a disposed at a tip side thereof and having a frusto-conical shape that is widened as it goes rearward. The engaging section 26a forms a tapered outer circumferential surface 26b having a circular cross section. The tapered hole forming section 27 forms a tapered hole 27a coaxial with the tapered shaft section 26. The tapered hole 27a forms a tapered inner circumferential surface 27b having a circular cross section matched to the tapered outer circumferential surface 26b. The tapered shaft section 26 and the tapered hole forming section 27 are engaged with each other by a biasing force of the biasing members 28 in the depth direction, and rearward movement of the position reference holder 20 is allowed while restricting forward movement of the position reference holder 20 at a prescribed position (an initial position).

The biasing members 28 are, for example, compression coil springs compressed between the position reference holder 20 and the holding member 3, and the tapered structure section 25 is sandwiched between the pair of biasing members 28. The biasing members 28 bias the position reference holder 20 forward so as to be separated with respect to the holding member 3 (toward the initial position).

When the position reference holder 20 is moved rearward against the biasing force of the biasing members 28, the tapered outer circumferential surface 26b and the tapered inner circumferential surface 27b are separated from each other, and inclination of the position reference holder 20 around the X axis and the Z axis and displacement in the X axis and the Z axis are allowed. In addition, when the tapered structure section 25 is solely provided, since the tapered outer circumferential surface 26b and the tapered inner circumferential surface 27b are circular in cross section, inclination (rotation) of the position reference holder 20 around the Y axis is also allowed. In addition, displacement in the Y axis is also allowed when the position reference holder 20 is moved rearward. Accordingly, when the position reference holder 20 is moved rearward, the position reference holder 20 becomes in a state in which the position reference holder 20 can be relatively displaced about three axes (a floating state), and the three reference abutting sections 24 of the position reference holder 20 can reliably abut the three position references 52 of the radar sensor 50.

Figure 18:
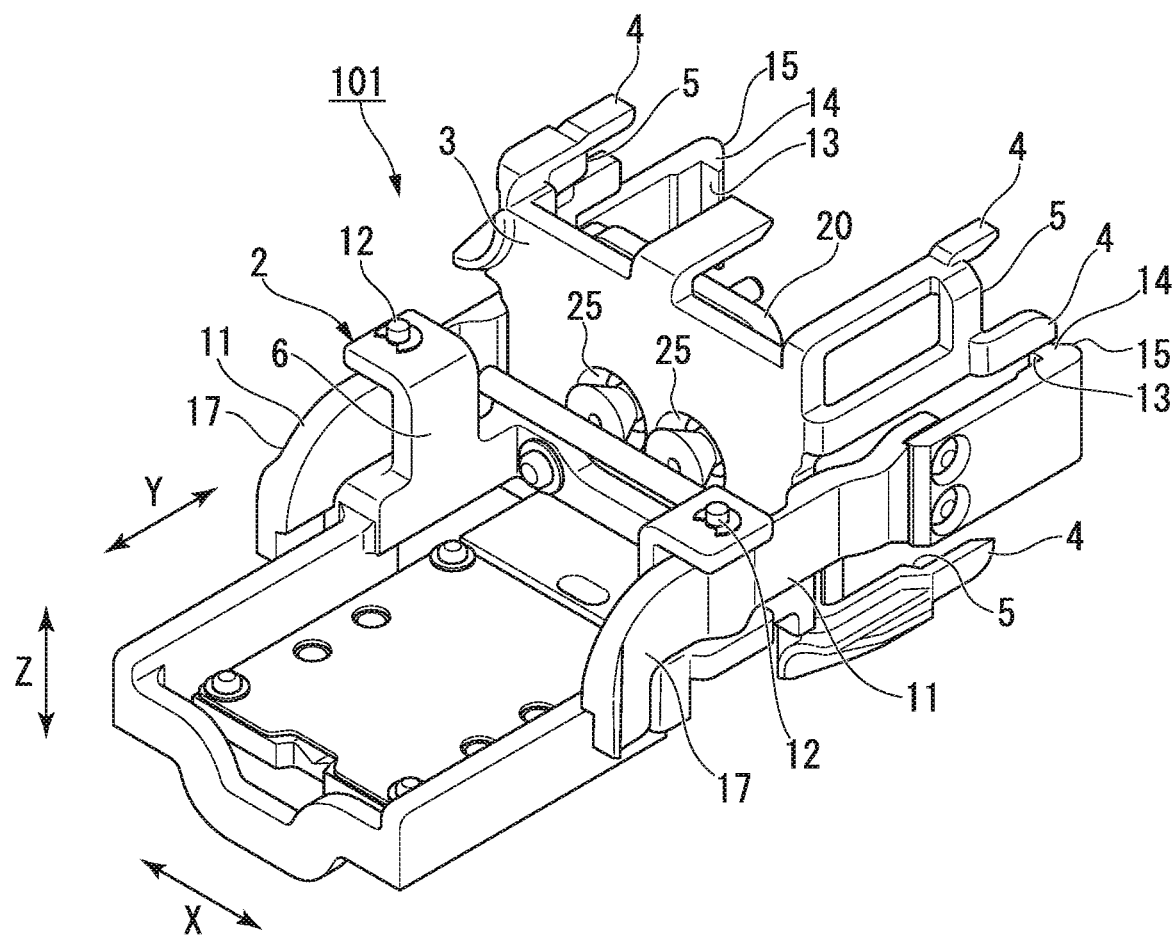
FIG. 18 is a perspective view of a position detecting device of a second embodiment.
Figure 19:
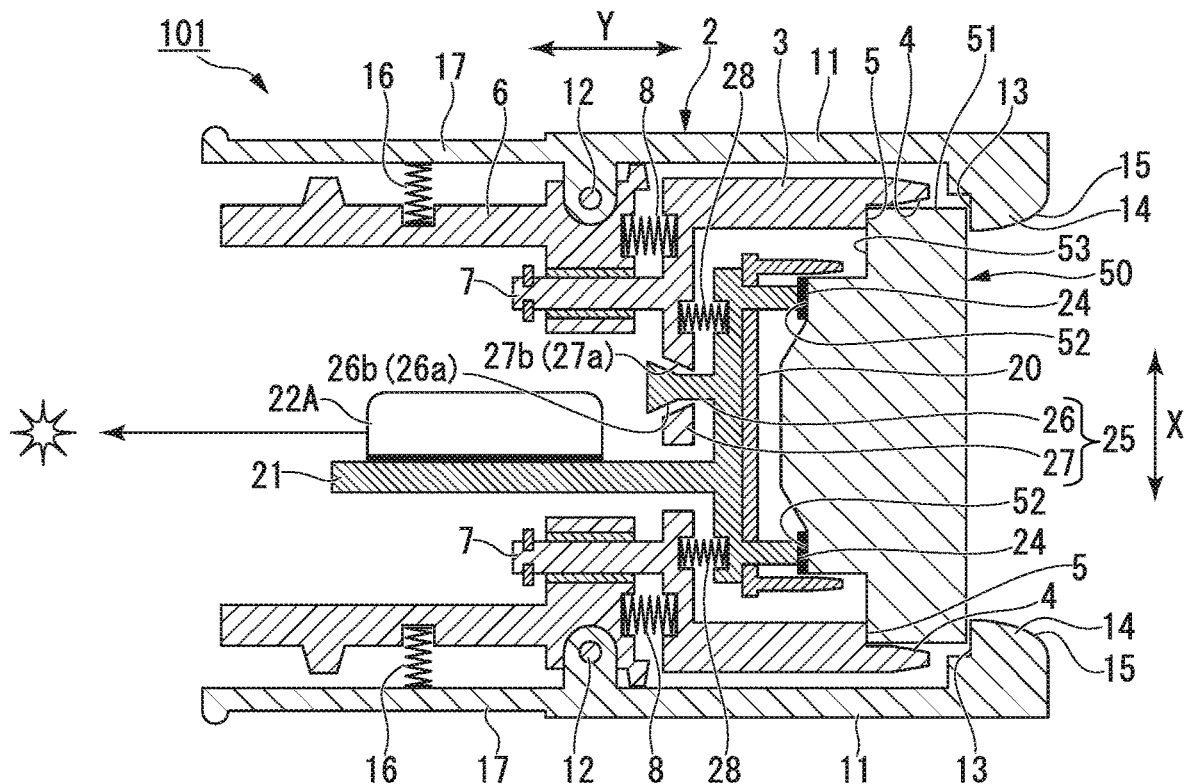
FIG. 19 is a schematic cross-sectional view showing an example in which a laser pointer is mounted on the position detecting device of the second embodiment.
Figure 20:
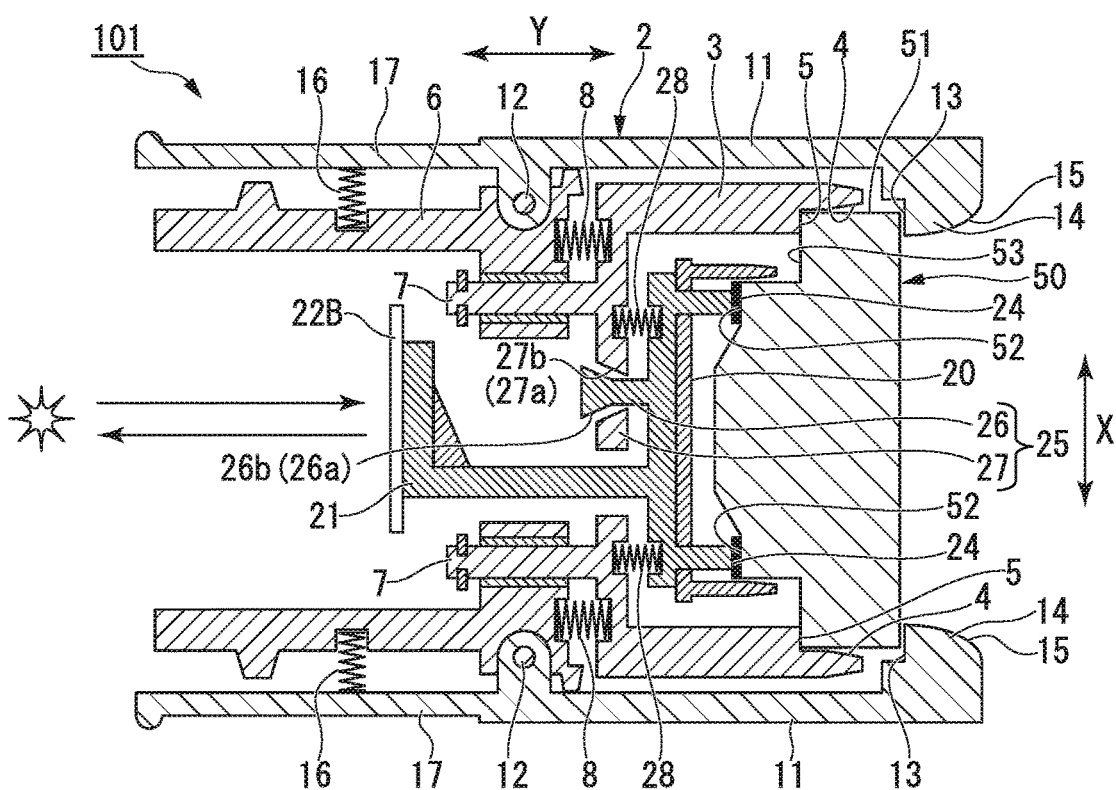
FIG. 20 is a schematic cross-sectional view showing an example in which a mirror is mounted on the position detecting device of the second embodiment.
Figure 21:
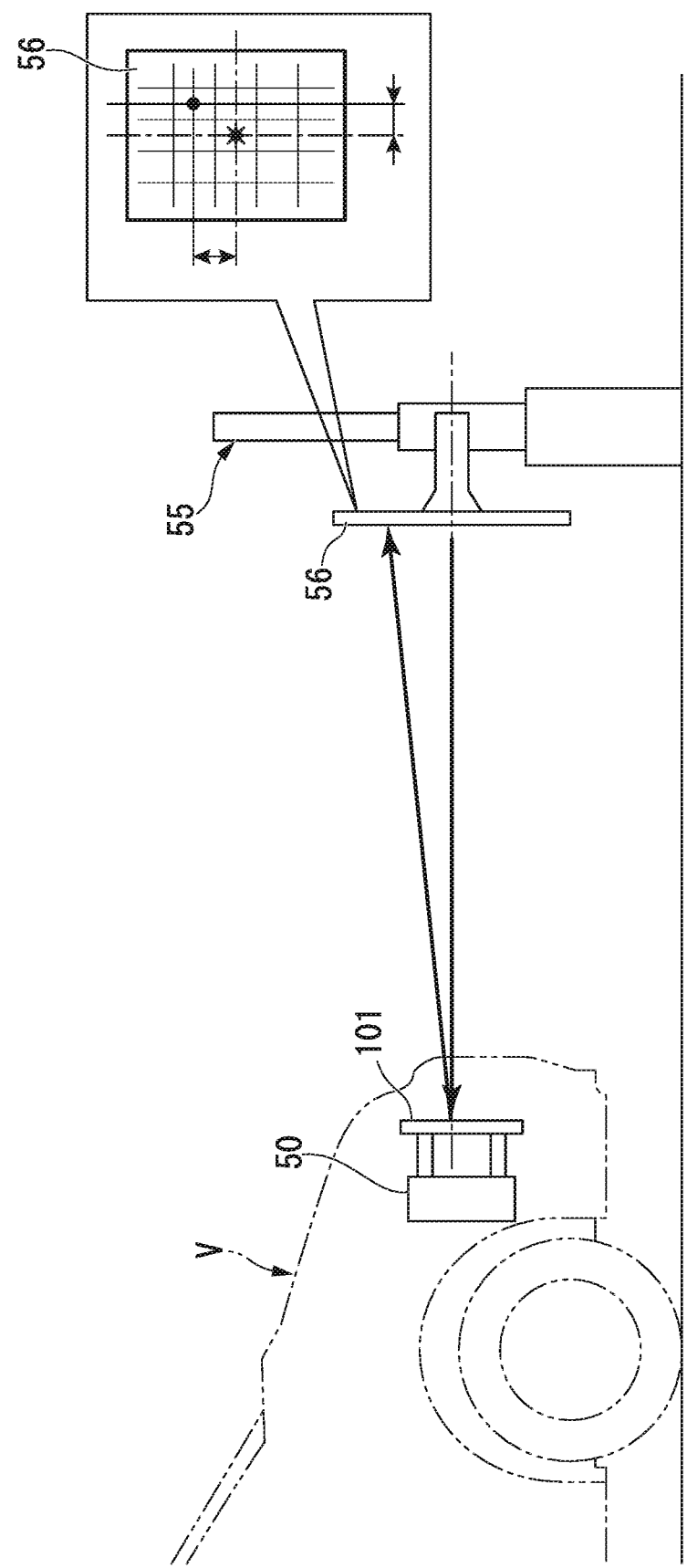
FIG. 21 is a side view showing a use example of the position detecting device of the second embodiment.

Further, for example, as shown in FIG. 4 or FIG. 18 of a second embodiment, which will be described below, since the plurality of tapered structure sections 25 are provided, while the displacement of the position reference holder 20 in the X axis, the Y axis and the Z axis is made allowable and inclination of the position reference holder 20 around the X axis and the Z axis is made allowable, excessive inclination of the position reference holder 20 around the Y axis can be restricted.

Figure 10A:
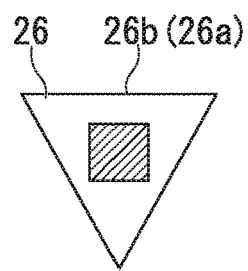
FIG. 10A is a schematic cross-sectional view showing a modified example of a tapered structure section of the position detecting device of the first embodiment.
Figure 10B:
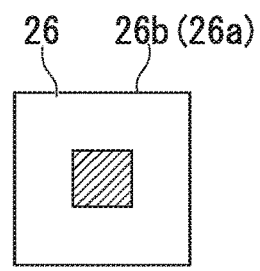
FIG. 10B is a schematic cross-sectional view showing a modified example of the tapered structure section of the position detecting device of the first embodiment.
Figure 10C:
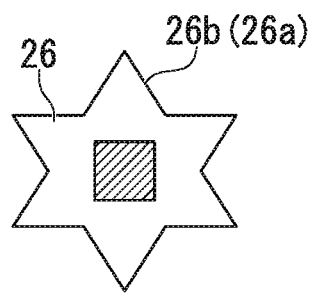
FIG. 10C is a schematic cross-sectional view showing a modified example of the tapered structure section of the position detecting device of the first embodiment.
Figure 11:
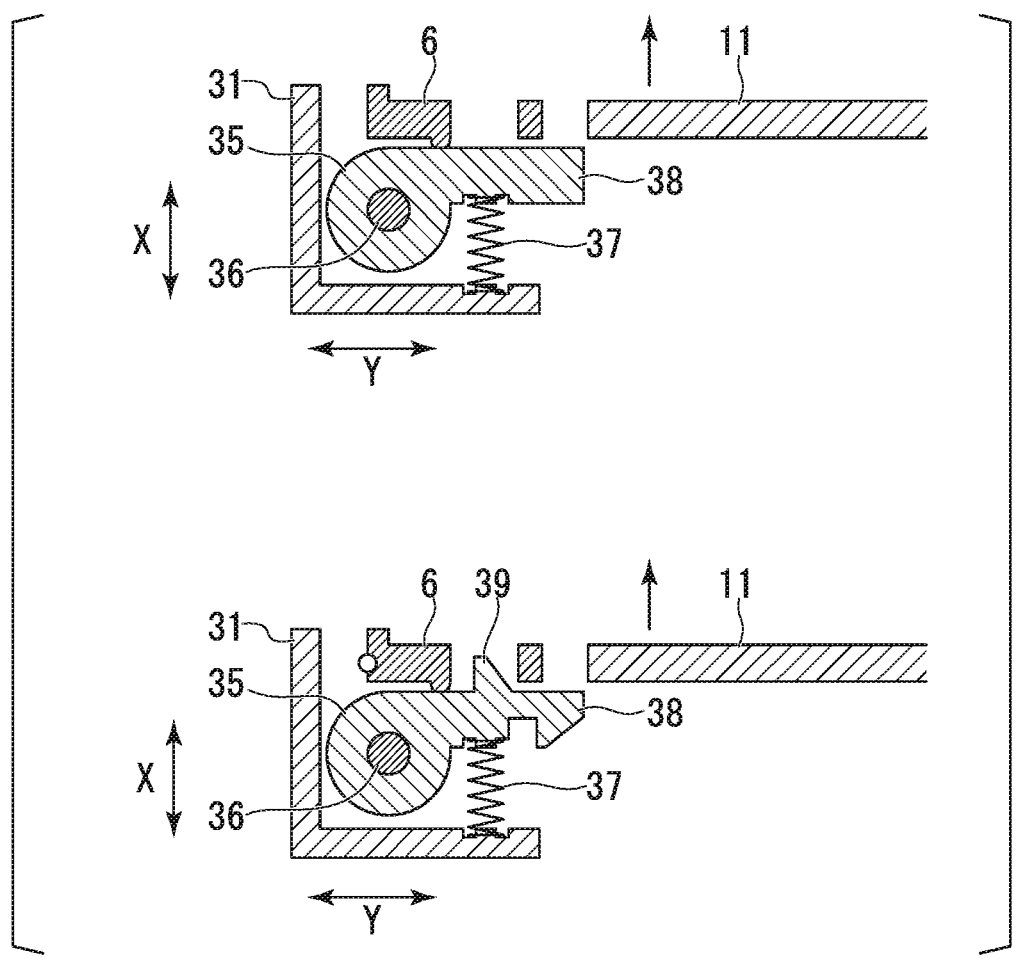
FIG. 11 is a schematic cross-sectional view showing a first action of a restricting member of the position detecting device of the first embodiment.
Figure 12:
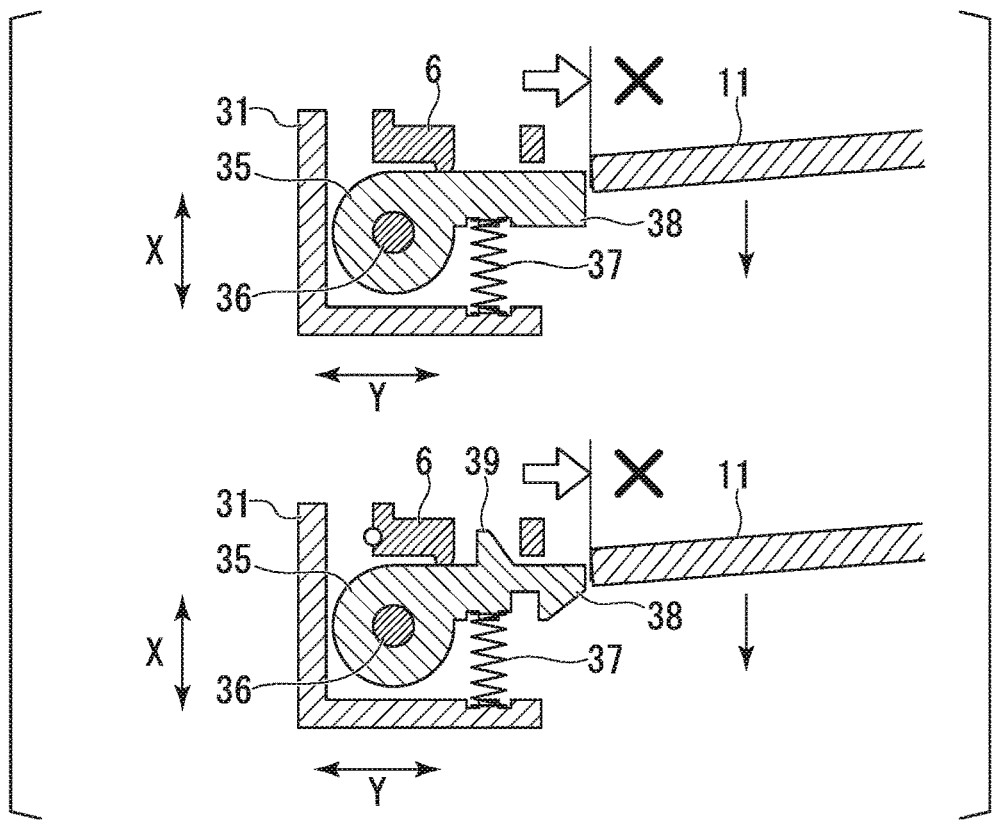
FIG. 12 is a schematic cross-sectional view showing a second action of the restricting member of the position detecting device of the first embodiment.
Figure 13:
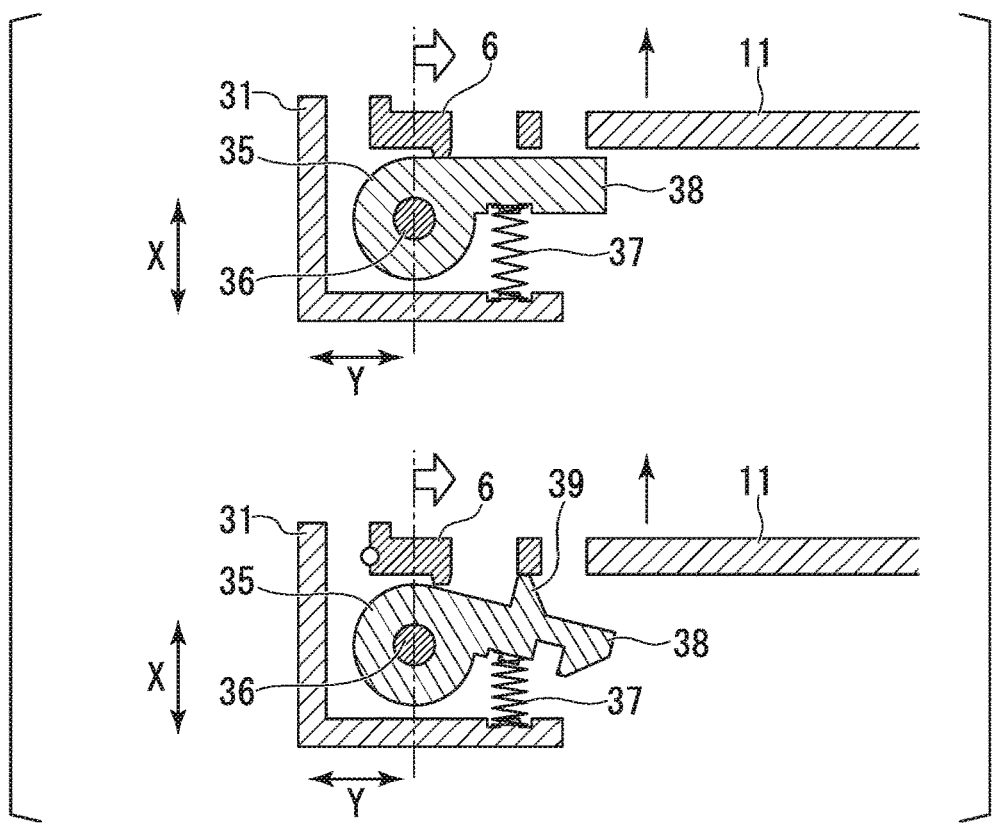
FIG. 13 is a schematic cross-sectional view showing a third action of the restricting member of the position detecting device of the first embodiment.

In addition, the engaging section 26a is not limited to a frusto-conical shape, and as shown in FIG. 10A to FIG. 10C, the engaging section 26a may have a cross-sectional shape of a frustum (a cross-sectional shape having a variable distance from an axial center) having corner sections (concavo-convex sections) such as a polygonal shape, a star shape, or the like. In this case, since the tapered hole 27a is also formed to be matched to the engaging section 26a and the tapered outer circumferential surface 26b and the tapered inner circumferential surface 27b are matched to each other, inclination of the position reference holder 20 about the Y axis can be restricted by the single tapered structure section 25.

As shown in FIG. 4 to FIG. 6, the position reference holder 20 includes the reference abutting section 24 at three points abutting three of the position references 52 in the radar sensor 50. The reference abutting section 24 at three points can reliably abut the three position references 52 of the radar sensor 50 regardless of the positional deviation, inclination, or the like, of the connecting structure 2 since the position reference holder 20 is in the floating support state.

The holding member 3 includes a first abutting section 5 abutting the radar sensor 50 from behind. The plurality of (at least a pair on both sides in the widthwise direction) first abutting sections 5 are formed to be close to, for example, the plurality of guiding claws 4.

The holding member 3 is supported to be strokable with respect to the main body section 6 of the connecting structure 2 in the depth direction. The holding member 3 is supported in the main body section 6 via a stroke guide section 7 and first biasing members 8. The pair of stroke guide sections 7 are formed on, for example, both sides in the widthwise direction. The pair of first biasing members 8 are, for example, compression coil springs compressed between the holding member 3 and the main body section 6, and for example, installed further outside than the stroke guide sections 7 in the widthwise direction. The first biasing members 8 bias the holding member 3 to be separated forward from the main body section 6. The holding member 3 is supported by the main body section 6 in a state in which a first biasing force directed forward is applied. The first biasing force of the first biasing members 8 is larger than a biasing force of the biasing members 28 that bias the position reference holder 20.

The holding member 3 pushes the first abutting section 5 against a connecting section 53 avoiding the antenna (the detection unit) outside the radar sensor 50 in the widthwise direction, and holds the connecting section 53 of the radar sensor 50 in cooperation with the lever member 11 (see FIG. 9) while being displaced rearward against the first biasing force.

Referring to FIG. 1 along with FIG. 2, the pair of lever members 11 are installed on both sides of the main body section 6 in the widthwise direction. Each of the lever members 11 is formed in a belt-like shape extending in the depth direction, and an intermediate section in the depth direction is supported on an outer portion of the main body section 6 in the widthwise direction via a swing shaft 12 in the height direction. The both side portions of the lever member 11 in the depth direction are made to be swingable such that both side portions in the depth direction can be displaced inward and outward in the widthwise direction.

Second abutting sections 13 are formed on front end portions of the lever members 11. The second abutting sections 13 abut the connecting section 53 of the radar sensor 50 from a side opposite to the first abutting section 5 of the holding member 3 in the depth direction. The first abutting section 5 and the second abutting sections 13 sandwich the connecting section 53 of the radar sensor 50 in the depth direction in a state in which the holding member 3 is displaced rearward against the first biasing force. Accordingly, the connecting section 53 of the radar sensor 50 is sandwiched between the lever members 11 and the holding member 3 with the first biasing force being applied, and the connecting structure 2 becomes to a connected state with the radar sensor 50.

The front end portions of the lever members 11 include lever protrusions 14 protruding inward in the widthwise direction to overlap the connecting section 53 of the radar sensor 50 when seen in the depth direction (see FIG. 4). The second abutting sections 13 are formed on rear sides of the lever protrusions 14, and guide sections 15, that are inclined or curved so that the more front side thereof is more separated from the radar sensor 50 in the widthwise direction, are formed on front sides of the lever protrusions 14.

The lever members 11 are supported on the main body section 6 via the swing shaft 12 and second biasing members 16. The second biasing members 16 are, for example, compression coil springs compressed between areas of the lever members 11 that are on the rear side than the swing shaft 12 and the main body section 6. The second biasing members 16 bias rear sections of the lever members 11 so that the rear sections of the lever members 11 are separated outward in the widthwise direction with respect to the main body section 6, and bias the lever protrusions 14 so that the lever protrusions 14 are moved inward in the widthwise direction. The lever members 11 are supported by the main body section 6 in a state in which a second biasing force is applied to cause the lever protrusions 14 to approach the main body section 6. Hereinafter, a state in which the lever members 11 swing the lever protrusions 14 so that the lever protrusions 14 approach the main body section 6 is referred to as a closed state, and a state in which the lever members 11 swing the lever protrusions 14 so that the lever protrusions 14 are separated from the main body section 6 is referred to as an open state.

Figure 7:
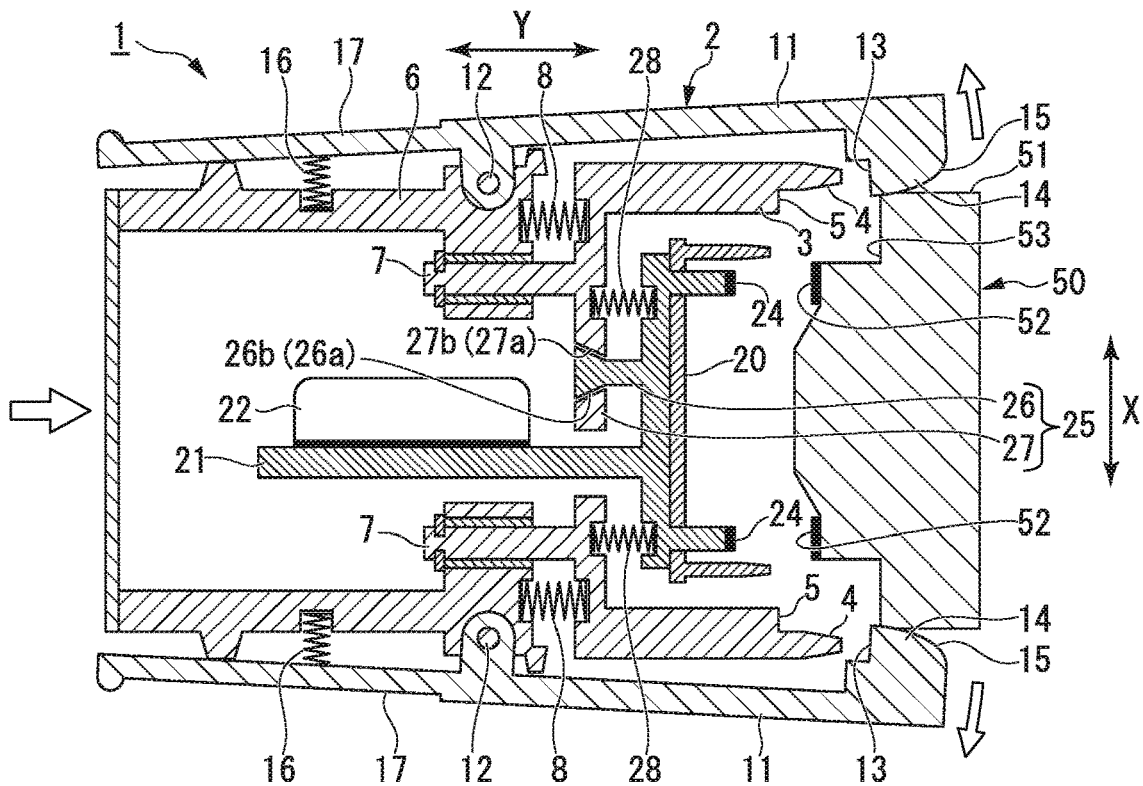
FIG. 7 is a cross-sectional view which corresponds to FIG. 6 and which shows a first action of the position detecting device of the first embodiment.

In the above-mentioned configuration, when the position detecting device 1 approaches the radar sensor 50, which is an object to be inspected, in the depth direction from a rear side toward a front side, first, as shown in FIG. 7, the guide sections 15 of the lever members 11 come in contact with the connecting section 53 of the radar sensor 50. Then, the lever protrusions 14 are moved outward in the widthwise direction along the inclination of the guide sections 15 while the guide sections 15 are in sliding contact with the connecting section 53 of the radar sensor 50. That is, the lever members 11 swing against the second biasing force. Here, as the lever protrusions 14 are raised up outward in the widthwise direction of the connecting section 53 of the radar sensor 50, the position detecting device 1 becomes possible to advance further since the lever protrusions 14 is arranged to avoid the radar sensor 50.

Figure 9:
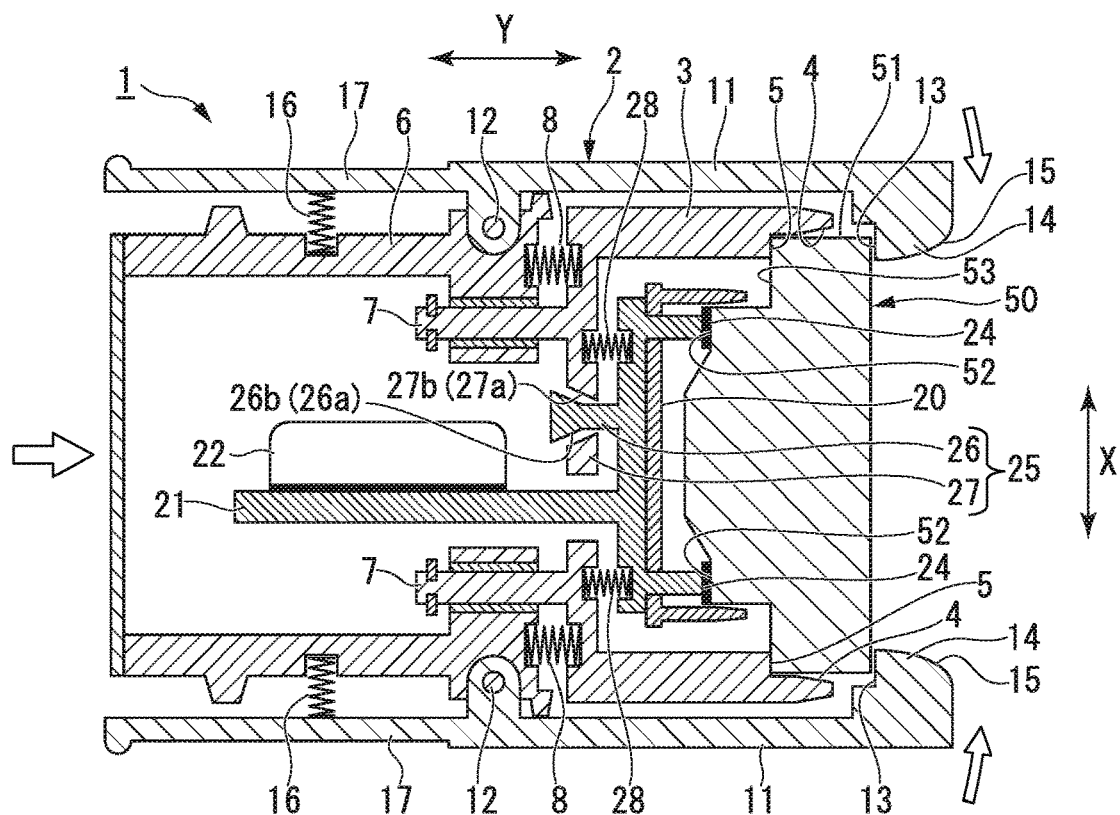
FIG. 9 is a cross-sectional view which corresponds to FIG. 6 and which shows a third action of the position detecting device of the first embodiment.

When the position detecting device 1 is further advanced and passes beyond a range in which the lever protrusions 14 come in contact with the radar sensor 50, as shown in FIG. 9, the lever members 11 are swung by the second biasing force and the lever protrusions 14 are moved inward in the widthwise direction. That is, the lever members 11 are returned to a state before the swinging due to the second biasing force. Here, the lever protrusions 14 are disposed at a position overlapping the radar sensor 50 when seen in the depth direction. Accordingly, the radar sensor 50 is sandwiched between the second abutting sections 13 of the lever members 11 and the first abutting sections 5 of the holding member 3.

In the middle of a step of moving the position detecting device 1 forward, the first abutting section 5 of the holding member 3 abuts the connecting section 53 of the radar sensor 50 from behind. When the position detecting device 1 is further moved forward from this position, the holding member 3 is stroked rearward from the main body section 6 against the biasing force of the first biasing members 8. When the radar sensor 50 is sandwiched between the second abutting sections 13 and the first abutting sections 5 in this state, the radar sensor 50 is sandwiched therebetween in the depth direction by the first biasing force.

Figure 8:
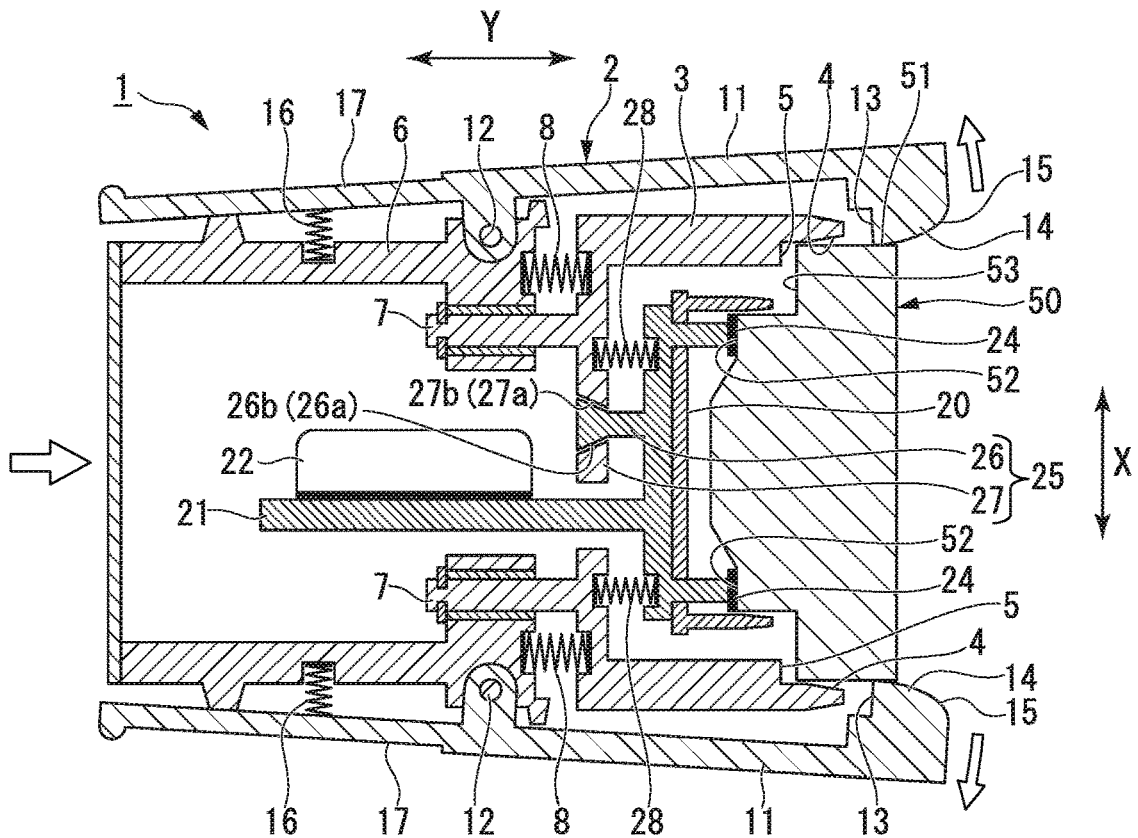
FIG. 8 is a cross-sectional view which corresponds to FIG. 6 and which shows a second action of the position detecting device of the first embodiment.

In addition, in a step before the first abutting section 5 of the holding member 3 abuts the radar sensor 50, as shown in FIG. 8, the reference abutting section 24 of the position reference holder 20 abuts the position references 52 of the radar sensor 50 from behind. Here, since the biasing force of the biasing members 28 that bias the position reference holder 20 is smaller than the first biasing force of the first biasing members 8 that bias the holding member 3, when the position detecting device 1 is further moved forward from this position, as shown in FIG. 9, the position reference holder 20 is moved rearward with respect to the holding member 3 against the biasing force of the biasing members 28. Accordingly, since the position reference holder 20 is in the floating support state, the three points of the reference abutting section 24 can reliably abut the three points of the position references 52 of the radar sensor 50 regardless of the positional deviation, inclination, or the like, of the connecting structure 2. In addition, since the position reference holder 20 is stably pressed against the radar sensor 50 by the biasing force of the biasing members 28 and a load in the depth direction applied to the radar sensor 50 is limited to the biasing force of the position reference holder 20 serving as an upper limit, a load with respect to the radar sensor 50 can be minimized.

Figure 16:
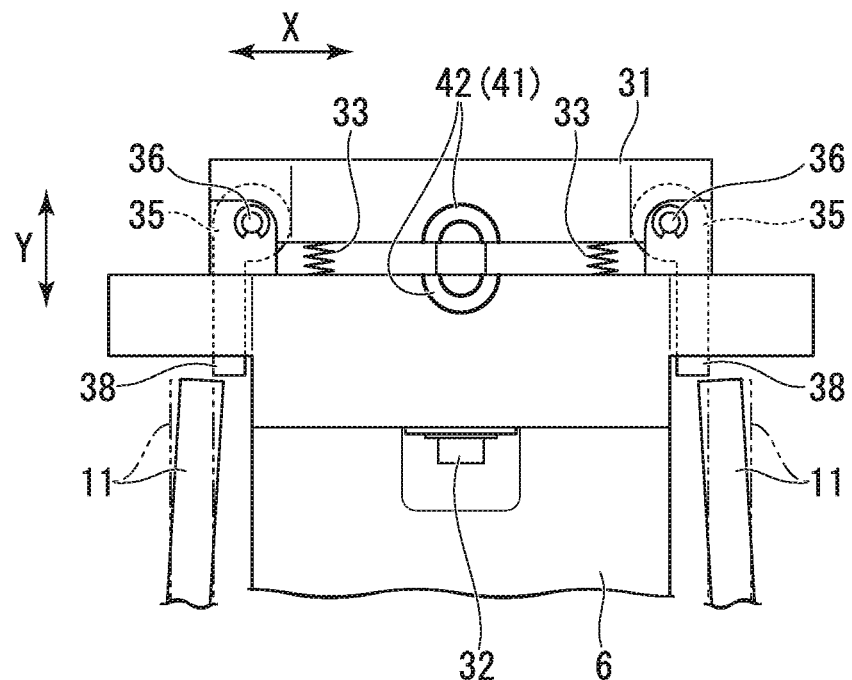
FIG. 16 is a schematic cross-sectional view showing a first action of a recognition section of the position detecting device of the first embodiment.
Figure 17:
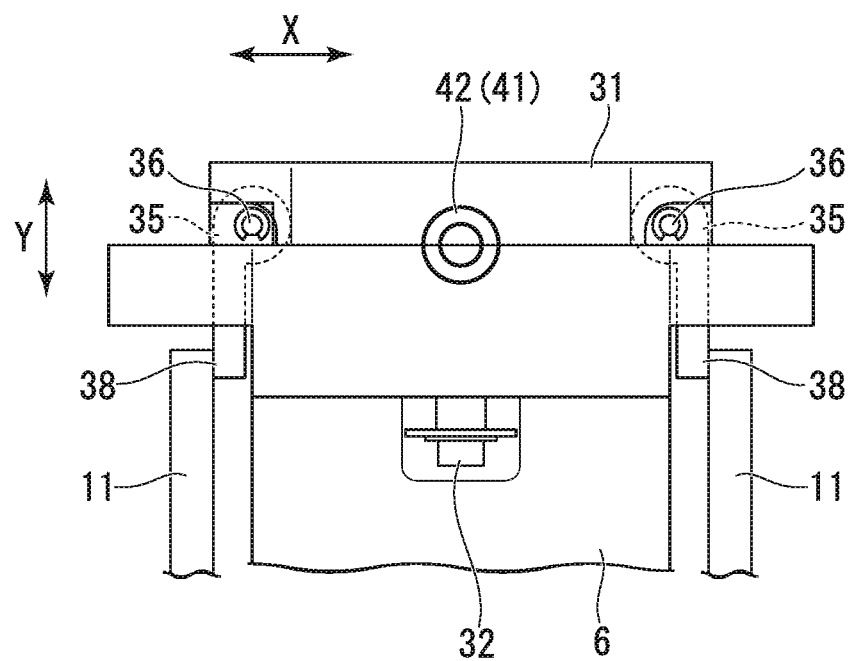
FIG. 17 is a schematic cross-sectional view showing a second action of the recognition section of the position detecting device of the first embodiment.

As shown in FIG. 1, FIG. 16 and FIG. 17, the position detecting device 1 includes a pressing member 31, restricting members 35 and a recognition section 41 on the rear end portion of the connecting structure 2.

The pressing member 31 is supported by the rear end portion of the main body section 6 to be stroked in the depth direction. The pressing member 31 is operated to be pushed forward by a worker when the connecting structure 2 is connected to the radar sensor 50. The pressing member 31 is supported on the main body section 6 via a stroke guide section 32 and third biasing members 33. The third biasing members 33 are, for example, compression coil springs compressed between the pressing member 31 and the main body section 6. The third biasing members 33 bias the pressing member 31 so that the pressing member 31 is separated from the main body section 6 toward the rear side. The pressing member 31 is supported by the main body section 6 in a state in which a third biasing force directed rearward is applied.

The pair of restricting members 35 are installed on, for example, both sides in the widthwise direction. The restricting members 35 are supported on the pressing member 31 via a swing shaft 36 and fourth biasing members 37. The swing shaft 36 extends in the height direction. The restricting members 35 have forward extension sections 38 extending further forward than the swing shaft 36. The fourth biasing members 37 are, for example, compression coil springs compressed between the forward extension sections 38 and the pressing member 31. The fourth biasing members 37 bias the forward extension sections 38 so that the forward extension sections 38 are separated outward with respect to the pressing member 31 in the widthwise direction. The restricting members 35 are supported by the pressing member 31 in a state in which a fourth biasing force is applied to separate the forward extension sections 38 from the pressing member 31.

The restricting members 35 can be moved integrally with the pressing member 31 in the depth direction. The restricting members 35 swing the forward extension sections 38 outward in the widthwise direction using the fourth biasing force. Referring to FIG. 16, the forward extension sections 38 avoid the rear end portions of the lever members 11 in the depth direction and the widthwise direction when the pressing member 31 is at an initial position, which is a position in which the pressing member 31 is moved rearward, and the lever members 11 are in a closed state (shown by a two-dotted chain line in FIG. 16). Here, forward movement of the pressing member 31 disposed at the initial position is allowed.

Meanwhile, the forward extension sections 38 can be engaged with the rear ends of the lever members 11 in the depth direction when the pressing member 31 is at the initial position and the lever members 11 are in an open state (shown by a solid line in FIG. 16). Here, forward movement of the pressing member 31 at the initial position is restricted.

As shown in FIG. 11 to FIG. 15, for example, one of the pair of restricting members 35 is provided with a protruding restriction claw 39 that is engaged with the main body section 6 when the pressing member 31 is disposed at a stroke position, which is a position in which the pressing member 31 is moved forward, and that is configured to restrict the pressing member 31 from returning to the initial position. The restriction claw 39 is engaged with the main body section 6 when the forward extension section 38 of the corresponding restricting member 35 is swung outward in the widthwise direction, and restricts the pressing member 31 from returning to the initial position (see FIG. 14). The restriction claw 39 releases engagement with the main body section 6 when the forward extension sections 38 is swung inward in the widthwise direction, and allows the pressing member 31 to return to the initial position (see FIG. 15).

Referring to FIG. 1 and FIG. 6, portions of the lever members 11 behind the swing shaft 12 serve as operation units 17 configured to enable the lever members 11 to be swingable against the second biasing force. The operation units 17 can be operated so as to switch the closed state of the lever members 11 to the open state against the biasing force of the second biasing members 16 by gripping the operation units 17 inward in the widthwise direction.

Figure 14:
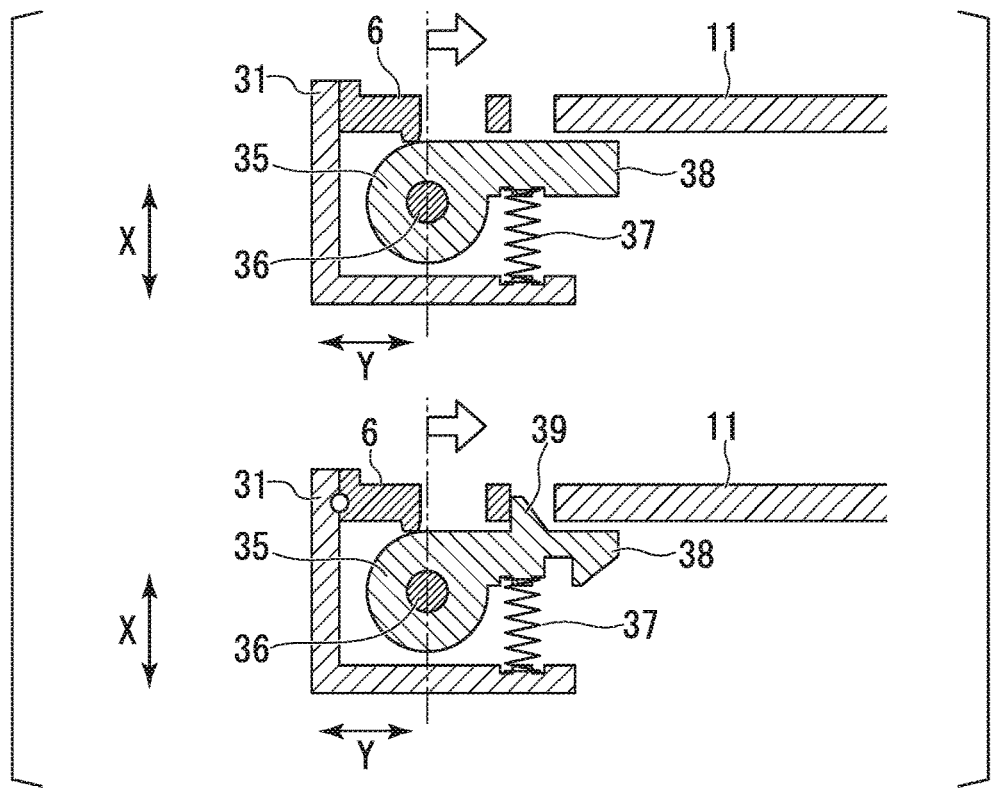
FIG. 14 is a schematic cross-sectional view showing a fourth action of the restricting member of the position detecting device of the first embodiment.
Figure 15:
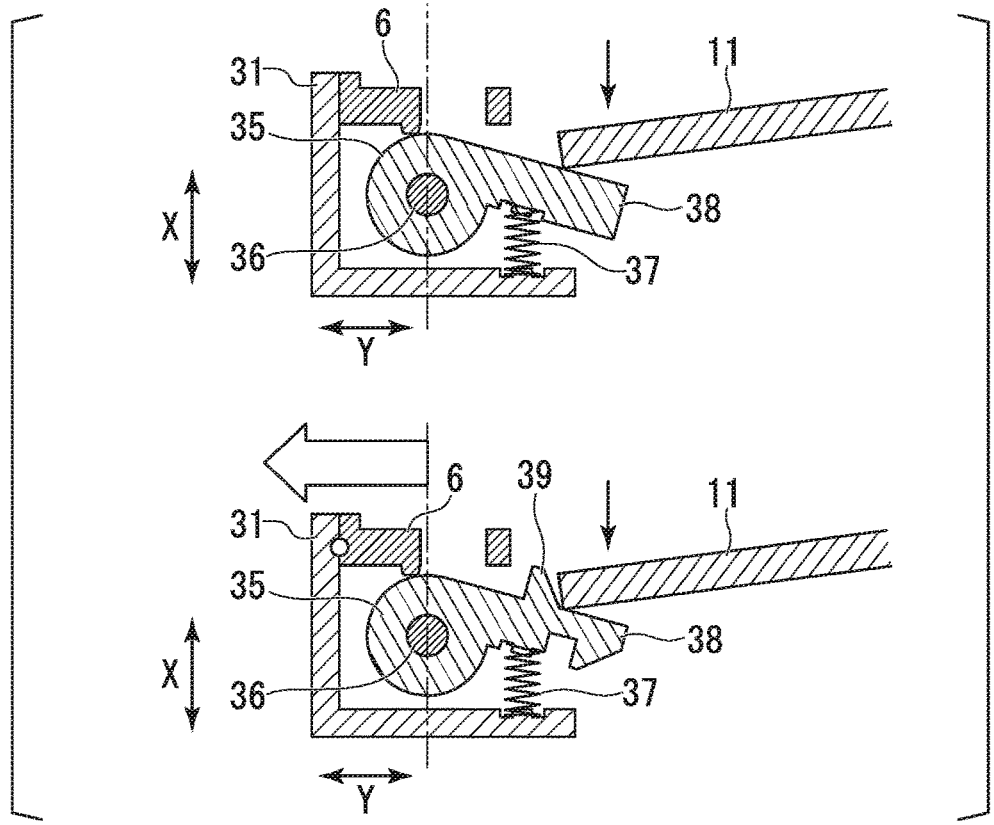
FIG. 15 is a schematic cross-sectional view showing a fifth action of the restricting member of the position detecting device of the first embodiment.

The forward extension sections 38 can be engaged with the rear end portions of the lever members 11 in the closed state in the widthwise direction when the pressing member 31 is at the stroke position (see FIG. 14).

From this state, when the lever members 11 are swung to become the open state, the restricting members 35 are swung to release engagement of the restriction claw 39 (see FIG. 15), and the pressing member 31 is returned to the initial position by the third biasing force.

That is, when the pressing member 31 is at the stroke position, since the operation units 17 of the lever members 11 are operated and the lever members 11 in the closed state are shifted to the open state, the pressing member 31 can be returned to the initial position.

Referring to FIG. 16 and FIG. 17, the recognition section 41 allows a worker to recognize that the pressing member 31 has moved to the stroke position. The recognition section 41 is, for example, a notification mark 42 formed to bridge the pressing member 31 and the main body section 6. The notification mark 42 is, for example, a circular mark, and divided into halves in the depth direction and installed on the pressing member 31 and the main body section 6, respectively. The recognition section 41 divides the notification mark 42 when the pressing member 31 is at the initial position, and allows a worker to recognize that the pressing member 31 is disposed at the initial position (see FIG. 16). The recognition section 41 integrates the notification mark 42 when the pressing member 31 is at the stroke position, and allows a worker to recognize that the pressing member 31 is disposed at the stroke position (see FIG. 17).

Disposition of the pressing member 31 at the stroke position corresponds to the completion of attachment of the position detecting device 1 to the radar sensor 50. That is, attachment of the position detecting device 1 to the radar sensor 50 is performed by connection of the connecting structure 2 to the radar sensor 50. Connection of the connecting structure 2 to the radar sensor 50 is performed by pushing the connecting structure 2 forward and sandwiching the radar sensor 50 between the lever members 11 and the holding member 3. Here, at the time the lever members 11 are in the closed state, the pressing member 31 can move forward to reach the stroke position, and the completion of attachment of the position detecting device 1 can be recognized by a worker by the integration of the notification mark 42.

In the above-mentioned configuration, when the position detecting device 1 approaches the radar sensor 50 from behind while the pressing member 31 is at the initial position (FIG. 11), as described above, the lever protrusions 14 of the lever members 11 come in sliding contact with the radar sensor 50, and the lever members 11 are swung along inclinations of the guide sections 15 to become the open state. Accordingly, the restricting members 35 can be engaged with the rear ends of the lever members 11 in the depth direction, and forward movement of the pressing member 31 is restricted (see FIG. 12).

That is, in the case in which the position detecting device 1 is attached to the radar sensor 50 from behind, when the lever members 11 are in the open state, in other words, when the position detecting device 1 is in a step in the middle of attachment, even though the pressing member 31 is pushed forward, movement of the pressing member 31 is restricted by the restricting members 35. For this reason, the divided notification mark 42 can be visually recognized by the recognition section 41, and a worker recognizes that the position detecting device 1 is in the step in the middle of attachment procedure from the state of the recognition section 41.

Meanwhile, when the lever protrusions 14 of the lever members 11 pass through a range in which the lever protrusions 14 are in contact with the radar sensor 50 and the lever members 11 are returned to the closed state, the lever members 11 and the holding member 3 sandwich the radar sensor 50 and attachment of the position detecting device 1 is completed. Here, since restriction of movement of the pressing member 31 by the restricting members 35 is released, the pressing member 31 can be pushed forward by extending an attachment operation of the position detecting device 1 (see FIG. 13). Accordingly, when the pressing member 31 moves forward to reach the stroke position, the restriction claw 39 is engaged with the main body section 6 and the pressing member 31 is locked at the stroke position (see FIG. 14). In this state, the integrated notification mark 42 can be recognized by the recognition section 41, and a worker recognizes that the position detecting device 1 has shifted to the attachment complete state from the state of the recognition section 41.

In this way, since a worker recognizes movement of the pressing member 31 (and attachment completion of the position detecting device 1) from the notification mark 42 of the recognition section 41, incomplete attachment of the position detecting device 1 to the radar sensor 50 is minimized. Further, for example, since a switch configured to detect movement of the pressing member 31 to the stroke position is installed and software processing, in which position detection of the radar sensor 50 is not performed if the switch does not detect movement of the pressing member 31, is performed, a countermeasure of preventing incomplete attachment of the position detecting device 1 is also possible.

When the operation units 17 of the lever members 11 are operated in a state in which the position detecting device 1 is attached to the radar sensor 50, the lever members 11 are swung against the second biasing force, and sandwiching of the radar sensor 50 between the second abutting sections 13 of the lever members 11 and the first abutting sections 5 of the holding member 3 (i.e., attachment of the position detecting device 1) is released. Here, the restricting members 35 are swung to release the engagement of the restriction claw 39 according to swinging of the lever members 11 (see FIG. 15), and locking of the pressing member 31 is released. Then, the position detecting device 1 is moved rearward with respect to the radar sensor 50 and removed from the radar sensor 50 by the biasing force accumulated in the biasing members 8 and 28 of the position reference holder 20 and the holding member 3.

As described above, the position detecting device 1 according to the embodiment is used for positional adjustment of the radar sensor 50 serving as an object detector mounted in the vehicle V, and includes the connecting structure 2 that is connected to the radar sensor 50, and the position reference holder 20 that is supported by the connecting structure 2 in a state in which a biasing force to an initial position is applied, that is displaced against the biasing force in a state in which the connecting structure 2 is connected to the radar sensor 50 and that abuts the position references 52 of the radar sensor 50 in a floating support state.

According to the above-mentioned configuration, when the connecting structure 2 is connected to the radar sensor 50, since the position reference holder 20 is pushed against the position references 52 of the radar sensor 50 in the floating support state, the position reference holder 20 can be reliably pushed against the position references 52 of the radar sensor 50 without being affected by an error (shift, tolerance, or the like, of the connecting portion) when the connecting structure 2 is connected to the radar sensor 50. For this reason, positional or angular deviation of the radar sensor 50 can be accurately detected by the position reference holder 20, and positional adjustment of the radar sensor 50 can be accurately performed.

Further, when the position detecting device 1 is attached to the radar sensor 50, the position detecting device 1 is in a cantilever-supported state, inclination inherently occurs in a device, and inclination also occurs in the radar sensor 50 that supports the device. As for this inclination, positional adjustment can be accurately performed by previously calculating a correction value according to a vehicle type of the object to be inspected and by reflecting the correction value in a detection result.

In addition, in the position detecting device 1, the connecting structure 2 includes the holding member 3 configured to hold the radar sensor 50 upon connection to the radar sensor 50, the holding member 3 includes the guiding claws 4 configured to come in contact with the outer portion 51 of the radar sensor 50 and to define a relative position of the holding member 3 with respect to the radar sensor 50, and the position reference holder 20 is supported by the holding member 3.

According to the above-mentioned configuration, since the position reference holder 20 is supported with respect to the holding member 3 by which a relative position with respect to the radar sensor 50 is defined, when the connecting structure 2 is connected to the radar sensor 50, the holding member 3 (the connecting structure 2) can be guided to a prescribed position by the guiding claws 4 without an accompanying load to the position reference holder 20 in a biased state. For this reason, positional deviation of the position reference holder 20 when the connecting structure 2 is connected to the radar sensor 50 is minimized, and a connecting operation of the connecting structure 2 can be easily performed.

In addition, in the position detecting device 1, the holding member 3 can be attached to one side of the radar sensor 50 in a first direction (a rear side in the depth direction), the holding member 3 includes the first abutting section 5 that abuts the connecting section 53 of the radar sensor 50 from the one side in the first direction, the holding member 3 is supported on the main body section 6 of the connecting structure 2 in a state in which the first biasing force is applied toward the other side in the first direction (a front side in the depth direction), and the holding member 3 holds the connecting section 53 of the radar sensor 50 in a state in which the first abutting section 5 is pushed against the connecting section 53 of the radar sensor 50 and displaced to one side in the first direction against the first biasing force.

According to the above-mentioned configuration, since the holding member 3 holds the radar sensor 50 in a state in which the holding member 3 is moved to the one side in the first direction against the first biasing force, the radar sensor 50 can be held by absorbing positional deviation, an error, or the like, of the radar sensor 50, and the connecting structure 2 can be reliably connected to the radar sensor 50.

In addition, in the position detecting device 1, the connecting structure 2 further includes the lever members 11 serving as a second holding member configured to hold the radar sensor 50 together with the holding member 3, the lever members 11 include the second abutting sections 13 that abut the connecting section 53 of the radar sensor 50 from the other side in the first direction, and the first abutting sections 5 and the second abutting sections 13 sandwich the connecting section 53 of the radar sensor 50 in a state in which the holding member 3 is displaced to one side in the first direction against the first biasing force.

According to the above-mentioned configuration, since the radar sensor 50 is sandwiched and held between the first abutting sections 5 of the holding member 3 and the second abutting sections 13 of the lever members 11 in a state in which the holding member 3 is moved to the one side in the first direction against the first biasing force, the radar sensor 50 can be held by absorbing positional deviation, an error, or the like, of the radar sensor 50, and the connecting structure 2 can be reliably connected to the radar sensor 50.

In addition, in the above-mentioned position detecting device 1, the lever members 11 extend in the first direction and can be swung in a direction crossing the first direction, the lever members 11 include the lever protrusions 14 protruding from the other side in the first direction so as to overlap the radar sensor 50 when seen in the first direction, the lever members 11 are supported by the main body section 6 in a state in which the second biasing force is applied to cause the lever protrusions 14 to approach the radar sensor 50, and the lever protrusions 14 include the second abutting sections 13 at the one side in the first direction, and the guide sections 15, which is inclined so that more other side thereof in the first direction is more separated from the radar sensor 50, at the other side in the first direction.

According to the above-mentioned configuration, since the position detecting device 1 can be attached to the radar sensor 50 through only a simple operation of causing the position detecting device 1 to approach the radar sensor 50 from the one side in the first direction, an attachment operation of the position detecting device 1 can be easily and rapidly performed without applying a set tact.

In addition, in the position detecting device 1, the connecting structure 2 includes the pressing member 31 that is movable toward the other side in the first direction with respect to the main body section 6 and that is capable of performing a pushing operation toward the other side in the first direction upon connection to the radar sensor 50, the restricting members 35 that are integrally movably supported by the pressing member 31, that is engageable with the lever members 11 in the first direction and that restricts movement of the pressing member 31 when engaged with the lever members 11 in the first direction, and the recognition section 41 configured to allow a worker to recognize that the pressing member 31 has moved toward the other side in the first direction, and the restricting members 35 allow movement of the pressing member 31 toward the other side in the first direction without engaging with the lever members 11 in the first direction in a state in which the lever members 11 are swung such that the lever protrusions 14 overlap the radar sensor 50 when seen in the first direction, and the restricting members 35 engage with the lever members 11 in the first direction and restrict movement of the pressing member 31 toward the other side in the first direction in a state in which the lever members 11 are swung such that the lever protrusions 14 do not overlap the radar sensor 50 when seen in the first direction.

According to the above-mentioned configuration, the position detecting device 1 is attached to the radar sensor 50 simply by only pushing the position detecting device 1 toward the radar sensor 50 from the one side in the first direction, and inappropriate setting of the position detecting device 1 can be minimized by the recognition section 41 and reliable attachment can be performed while an attachment operation of the position detecting device 1 can be easily and rapidly performed without applying a set tact.

In addition, in the position detecting device 1, the lever members 11 include the operation units 17 configured to swingably operate the lever members 11 against the second biasing force.

According to the above-mentioned configuration, the position detecting device 1 can be removed from the radar sensor 50 simply by only operating the operation units 17 of the lever members 11, and a removal operation of the position detecting device 1 can be easily and rapidly performed while a tact is not applied even when the position detecting device 1 is removed.

Further, while the position detecting device 1 is integrally attached to the radar sensor 50, the position detecting device 1 may be divided according to functions within a possible range according to necessity, and the split bodies may be attached to the radar sensor 50 in sequence. For example, after attachment of the main body section 6, the display unit 23, the pressing member 31, or the like, may be separately attached.

Second Embodiment

Next, a second embodiment of the present invention will be described with reference to FIG. 18 to FIG. 21.

The embodiment is particularly distinguished from the first embodiment in that, while the position detecting device 1 of the first embodiment is a self-contained type including the sensor main body 22 and the display unit 23, a position detecting device 101 is combined with a tester 55 separated from the vehicle V and is configured to perform position detection of a radar sensor 50. In addition, the same components as the embodiment are designated by the same reference numerals and detailed description thereof will be omitted.

In the position detecting device 101 of the embodiment, instead of the sensor main body 22, a laser pointer 22A (see FIG. 19) configured to irradiate a target board 56 of the tester 55 with laser light, a mirror 22B (see FIG. 20) configured to reflect the laser light emitted from the laser pointer of the tester 55 to the target board 56 of the tester 55, or the like, is mounted. Further, like the first embodiment, the sensor main body 22 such as a leveling instrument or the like can also be mounted.

Since the position detecting device 101 of the embodiment does not include the sensor main body 22 and the display unit 23, the main body section 6 of the connecting structure 2 is reduced in size (see FIG. 18). In addition, the rear sections of the lever members 11 are reduced in size in comparison with the first embodiment. In addition, the pressing member 31, the restricting members 35 and the recognition section 41 are not provided. However, like the first embodiment, the pressing member 31, the restricting members 35 and the recognition section 41 may also be provided while extending the lever members 11.

As described above, even in the position detecting device 101 according to the embodiment, when the connecting structure 2 is connected to the radar sensor 50, since the position reference holder 20 is pushed against the position references 52 of the radar sensor 50 in a floating support state, the position reference holder 20 can be reliably pushed against the position references 52 of the radar sensor 50 without being affected by an error (deviation, tolerance, or the like, of the connecting portion) when the connecting structure 2 is connected to the radar sensor 50.

For this reason, positional or angular deviation of the radar sensor 50 can be accurately detected by the position reference holder 20, and positional adjustment of the radar sensor 50 can be accurately performed.

Further, the present invention is not limited to the embodiments and, for example, the object detector serving as an attachment target of the position detecting device is not limited to the radar sensor and may be an optical sensor, a camera, or the like.

The biasing member used in the position detecting device is not limited to the compression coil spring and may be constituted by various metal springs, an elastic member formed of a resin or the like rather than a metal.

A connecting structure of the connection to the object detector is not limited to sandwiching of the object detector in the depth direction and may be sandwiched in the width direction or the height direction.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A position detecting device used for positional adjustment of an object detector mounted on a vehicle, the position detecting device comprising:
   a connecting structure that is connected to the object detector; and
   a position reference member that is supported by the connecting structure in a state in which a biasing force toward an initial position is applied, that is displaced against the biasing force in a state in which the connecting structure is connected to the object detector, that is pushed against a position reference of the object detector in a floating support state and that is configured to support a sensor main body which detects a position of the object detector.

2. The position detecting device according to claim 1, wherein the connecting structure comprises a holding member that holds the object detector upon connection to the object detector,
   the holding member comprises a guiding section that comes in contact with the object detector and that defines a relative position of the holding member with respect to the object detector, and the position reference member is supported by the holding member.

3. The position detecting device according to claim 2, wherein the holding member comprises a first abutting section that abuts a connecting section of the object detector from a first side in a first direction, the holding member is supported by a main body section of the connecting structure in a state in which a first biasing force is applied toward a second side in the first direction, and the holding member pushes the first abutting section against the connecting section of the object detector and holds the connecting section of the object detector while being displaced to the first side in the first direction against the first biasing force.

4. The position detecting device according to claim 3, wherein the connecting structure further comprises a second holding member that holds the object detector together with the holding member, the second holding member comprises a second abutting section that abuts the connecting section of the object detector from the second side in the first direction, and the first abutting section and the second abutting section hold the connecting section of the object detector sandwiched therebetween in a state in which the holding member is displaced to the first side in the first direction against the first biasing force.

5. The position detecting device according to claim 4, wherein the second holding member is a lever member that extends in the first direction and that is swingable about a swing shaft crossing the first direction, the lever member comprises a lever protrusion that protrudes toward the second side in the first direction so as to overlap the object detector when seen in the first direction, the lever member is supported by the main body section in a state in which a second biasing force is applied to cause the lever protrusion to approach the object detector, and the lever protrusion comprises the second abutting section at the first side in the first direction, and a guide section, which is inclined so that more second side thereof in the first direction is more separated from the object detector, at the second side in the first direction.

6. The position detecting device according to claim 5, wherein the connecting structure comprises:

a pressing member that is movable toward the second side in the first direction with respect to the main body section and that is capable of performing a pushing operation toward the second side in the first direction upon connection to the object detector;

a restricting member that is integrally movably supported by the pressing member, that is engageable with the lever member in the first direction and that restricts movement of the pressing member when engaged with the lever member in the first direction; and a recognition section that allows a worker to recognize that the pressing member has moved toward the second side in the first direction, wherein the restricting member allows movement of the pressing member toward the second side in the first direction without engaging with the lever member in the first direction in a state in which the lever member is swung such that the lever protrusion overlaps the object detector when seen in the first direction, and the restricting member engages with the lever member in the first direction and restricts movement of the pressing member toward the second side in the first direction in a state in which the lever member is swung such that the lever protrusion does not overlap the object detector when seen in the first direction.

7. The position detecting device according to claim 5, wherein the lever member comprises an operation unit that swingably operates the lever member against the second biasing force.

* * * * *